United States Patent
Yu et al.

(10) Patent No.: US 7,800,690 B2
(45) Date of Patent: Sep. 21, 2010

(54) LOW NOISE ENCODING AND DECODING APPARATUS AND METHOD

(75) Inventors: Haoping Yu, Carmel, IN (US); David Lowell McNeely, Indianapolis, IN (US); Billy Wesley Beyers, Jr., Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1005 days.

(21) Appl. No.: 11/014,079

(22) Filed: Dec. 15, 2004

(65) Prior Publication Data
US 2005/0190292 A1    Sep. 1, 2005

Related U.S. Application Data

(63) Continuation of application No. 09/555,488, filed as application No. PCT/US97/23992 on Dec. 23, 1997, now Pat. No. 6,873,368.

(51) Int. Cl.
*H04N 7/01*    (2006.01)
(52) U.S. Cl. .................................... 348/441
(58) Field of Classification Search .............. 348/441, 348/443, 445, 446, 448, 449, 458, 459, 452, 348/385.1, 387.1
See application file for complete search history.

(56) References Cited

U.S. PATENT DOCUMENTS

| | | | |
|---|---|---|---|
| 4,591,909 A | 5/1986 | Kuroda et al. | |
| 4,724,486 A | 2/1988 | Tonge et al. | |
| 4,731,664 A | 3/1988 | Nishiwaki et al. | |
| 4,897,855 A | 1/1990 | Acampora | |
| 4,945,549 A | 7/1990 | Simon et al. | |
| 4,984,078 A * | 1/1991 | Skinner et al. | 348/581 |
| 5,005,076 A | 4/1991 | Stroppina et al. | |
| 5,049,993 A | 9/1991 | LeGall et al. | |
| 5,063,608 A | 11/1991 | Siegel | |
| 5,128,776 A | 7/1992 | Scorse et al. | |
| 5,196,933 A | 3/1993 | Henot | |
| 5,253,059 A | 10/1993 | Ansari et al. | |
| 5,289,305 A | 2/1994 | Lake | |
| 5,299,019 A | 3/1994 | Pack et al. | |
| 5,327,235 A | 7/1994 | Richards | |

(Continued)

FOREIGN PATENT DOCUMENTS

CA    1 327 394    8/1989

(Continued)

OTHER PUBLICATIONS

International Search Rpt. for PCT/US97/23992 (4 pages).

(Continued)

*Primary Examiner*—Paulos M Natnael
(74) *Attorney, Agent, or Firm*—Robert D. Shedd; Paul P. Kiel; Brian J. Dorini

(57) ABSTRACT

An adaptive digital image processor precedes an MPEG2 encoder. The processor receives a high definition video signal intended for broadcast or storage, and adaptively low-pass filters the signal. The signal is subjected to low-pass two-dimensional filtering to eliminate encoding artifacts and related noise. The video signal is then horizontally down-sampled to create a lower resolution hybrid signal. A receiver decodes and decompresses the hybrid signal. The hybrid signal is upsampled to its original resolution using existing hardware and software with a software modification.

8 Claims, 3 Drawing Sheets

U.S. PATENT DOCUMENTS

| | | | |
|---|---|---|---|
| 5,351,087 A * | 9/1994 | Christopher et al. | 348/441 |
| 5,361,105 A | 11/1994 | Iu | |
| 5,430,492 A | 7/1995 | Dambacher | |
| 5,444,491 A | 8/1995 | Lim | |
| 5,446,498 A | 8/1995 | Boon | |
| 5,459,585 A | 10/1995 | Owashi et al. | |
| 5,485,215 A | 1/1996 | Meyer et al. | |
| 5,485,280 A | 1/1996 | Fujinami et al. | |
| 5,491,515 A | 2/1996 | Suzuki | |
| 5,502,510 A | 3/1996 | Kim et al. | |
| 5,508,746 A | 4/1996 | Lim | |
| 5,510,840 A | 4/1996 | Yonemitsu et al. | |
| 5,510,902 A | 4/1996 | Fujinami et al. | |
| 5,517,248 A | 5/1996 | Isoda | |
| 5,519,446 A | 5/1996 | Lee | |
| 5,530,484 A | 6/1996 | Bhatt et al. | |
| 5,534,938 A | 7/1996 | Citta et al. | |
| 5,542,008 A | 7/1996 | Sugahara et al. | |
| 5,543,939 A | 8/1996 | Harvey et al. | |
| 5,552,832 A | 9/1996 | Astle | |
| 5,594,552 A | 1/1997 | Fujinami et al. | |
| 5,600,573 A | 2/1997 | Hendricks et al. | |
| 5,610,661 A | 3/1997 | Bhatt | |
| 5,613,051 A | 3/1997 | Iodice et al. | |
| 5,671,298 A | 9/1997 | Markandey et al. | |
| 5,677,981 A | 10/1997 | Kato et al. | |
| 5,754,248 A | 5/1998 | Faroudja | |
| 5,799,111 A * | 8/1998 | Guissin | 382/254 |
| 5,801,777 A | 9/1998 | Lyu | |
| 5,805,222 A | 9/1998 | Nakagawa et al. | |
| 5,818,530 A | 10/1998 | Canfield et al. | |
| 5,825,424 A | 10/1998 | Canfield et al. | |
| 5,847,772 A * | 12/1998 | Wells | 348/571 |
| 5,875,003 A | 2/1999 | Kato et al. | |
| 5,926,573 A | 7/1999 | Kim et al. | |
| 5,963,262 A * | 10/1999 | Ke et al. | 348/447 |
| 5,987,215 A | 11/1999 | Kato et al. | |
| 5,999,220 A | 12/1999 | Washino | |
| 6,011,900 A | 1/2000 | Kato et al. | |
| 6,023,718 A | 2/2000 | Dischert et al. | |
| 6,025,878 A | 2/2000 | Boyce et al. | |
| 6,061,402 A | 5/2000 | Boyce et al. | |
| 6,108,047 A | 8/2000 | Chen | |
| 6,147,712 A | 11/2000 | Shimamoto et al. | |
| 6,157,739 A | 12/2000 | Yazawa et al. | |
| 6,160,846 A | 12/2000 | Chiang et al. | |
| 6,167,086 A | 12/2000 | Yu et al. | |
| 6,178,205 B1 * | 1/2001 | Cheung et al. | 375/240.29 |
| 6,184,935 B1 | 2/2001 | Iaquinto et al. | |
| 6,192,081 B1 | 2/2001 | Chiang et al. | |
| 6,239,847 B1 | 5/2001 | Deierling | |
| 6,310,602 B1 | 10/2001 | Kasai et al. | |
| 6,335,990 B1 | 1/2002 | Chen et al. | |
| 6,539,120 B1 * | 3/2003 | Sita et al. | 382/233 |
| 6,710,817 B2 * | 3/2004 | Oku et al. | 348/569 |
| 6,825,886 B2 * | 11/2004 | Kobayashi et al. | 348/405.1 |
| 6,873,368 B1 * | 3/2005 | Yu et al. | 348/441 |

FOREIGN PATENT DOCUMENTS

| | | |
|---|---|---|
| DE | 33 41 393 A1 | 6/1985 |
| EP | 0498625 | 8/1992 |
| EP | 0595323 | 5/1994 |
| EP | 0685968 | 12/1995 |
| EP | 0708564 | 4/1996 |
| EP | 1 040 666 | 10/2000 |
| JP | 6-225268 | 12/1994 |
| JP | 7-095566 | 4/1995 |
| JP | 8-130710 | 5/1996 |
| JP | 8-322023 | 12/1996 |
| JP | 9-034395 | 2/1997 |
| JP | 9-107549 | 4/1997 |
| JP | 9-247666 | 9/1997 |
| JP | 9-271026 | 10/1997 |
| JP | 9-298753 | 11/1997 |
| JP | 9-307894 | 11/1997 |
| RU | 2 017 348 C1 | 7/1994 |
| SU | 1 567 097 A1 | 2/1996 |
| WO | WO 93/17523 | 9/1993 |
| WO | WO 95/15659 | 6/1995 |
| WO | WO 96/27981 | 9/1996 |
| WO | WO 97/39577 | 10/1997 |
| WO | WO 99/33273 | 7/1999 |

OTHER PUBLICATIONS

Ngo, Calvin, "Image Resizing and Enhanced Digital Video Compression", Electrical Design News, Jan. 4, 1996, No. 1, Newton, MA, pp. 151.

* cited by examiner

LOW NOISE ENCODING AND DECODING APPARATUS AND METHOD

CROSS-REFERENCE TO RELATED APPLICATIONS

This application claims the benefit under 35 U.S.C. §120 and is a continuation of U.S. patent application Ser. No. 09/555,488 filed May 31, 2000, now U.S. Pat. No. 6,873,368 which in turn is the National Stage of International Patent Application PCT/US97/23992 designating the United States, filed Dec. 23, 1997. The disclosures of the above-mentioned applications are hereby incorporated by reference herein.

FIELD OF THE INVENTION

This invention concerns image compression for reducing the bandwidth requirements of a digital video encoder.

BACKGROUND OF THE INVENTION

The United States Federal Communications Commission (FCC) has approved a digital high definition television (HDTV) standard proposed by the Grand Alliance (GA), clearing the way for terrestrial digital television broadcasting in the United States. The GA HDTV system adopted the Motion Pictures Expert Group (MPEG2) video compression standard. For details, see "Information Technology—Generic Coding of Moving Picture and Associated Audio Information: Video," ISO/IEC 13818-2: 1996(E). Utilizing modern and sophisticated video compression methods, such as source processing, motion estimation and compensation, transform representation and statistical coding, an MPEG compression system can reduce the transmission bit rate by a factor of 50 or more. A full HD signal for one second requires approximately one billion bits before compression. As proposed in the GA specification, 1920 by 1080 pixel (picture element) images at a rate of 60 field per second are compressed to 18 megabits per second for digital broadcast.

The GA video compression system normally comprises two major subsystems, a pre-processor and an MPEG2 video encoder, followed by an output buffer. The input to the pre-processor is analog video in RGB format. The pre-processor digitizes the input signals and performs gamma correction on each color component to compensate for the non-linear response of the imaging camera. Gamma correction reduces the visibility of quantization noise contained in the compressed image, especially in the dark regions of the image. Then the pre-processor linearly transforms the digitized and gamma corrected RGB samples to the SMPTE 240M YC1C2 color space. Finally, the resulting chrominance components are sub-sampled to form the 4:2:0 digital video input signal. In addition to the tasks just described, the pre-processor may perform image conversion. For example, in a broadcast digital satellite system, the video signal is horizontally decimated from 720 pixels per line to 544 pixels per line to further reduce bandwidth requirements. This signal is sent to the MPEG2 video encoder.

The MPEG2 video encoder compresses the input digital video signal by removing some of the temporal redundancy between frames and some of the spatial redundancy within frames. Generally, compression is achieved by utilizing a number of different techniques in succession as described above. Adjusting the quantization precision allows the encoder to generate the compressed bit stream at any rate specified by the application. The quantization in MPEG2 systems is performed on the DCT coefficients of a data block, which may be the original image information or residual information from motion estimation. Using quantization matrices in combination with scalable quantization step sizes, the quantizer selects and quantizes only a small fraction of the DCT coefficients from every DCT block for transmission, resulting in significant data reduction. The quantization matrices can be varied on a frame basis according to the statistical distribution of the DCT coefficients and the content of the video signal. For different areas within a frame, the quantization can be fine tuned on a macroblock by macroblock basis by scaling the quantization step size based on the complexity of the macroblock. For a given output bit rate, an output buffer will provide control signals used by the encoder to adjust the quantization step size for a particular frame to maximize quantization resolution within the available bandwidth.

Ideally, the video compression system removes high frequency components which will not be perceived as missing by viewers when the image is reconstructed and displayed. The remaining low frequency components are quantized to fit within the available bandwidth. Quantization noise introduced to the signal should also be invisible to viewers upon image reconstruction. However, in a real system a trade-off is made between the information to transmit and the quantization step size for an available bandwidth. If the system does not drop sufficient coefficients for quantization, the system increases the quantization step size resulting in blocky artifacts in the reconstructed image. If the picture loses too much high frequency information during the compression process, the reconstructed image will contain other noticeable edge artifacts.

Moreover, differences in quantization between each frame causes frames within a group of pictures (GOP) to contain varying high frequency components. An I frame, for example, may have a substantial amount of high frequency coefficients dropped during encoding, whereas P and B frames retain high frequency components corresponding to those dropped in the I frame. The reconstructed GOP will now contain artifacts because the high frequency information varies between frames used to reconstruct each other.

These problems occur within the GA system as currently defined. Compressing the HD image signal further only decreases displayed picture quality. Satellite broadcast providers are unwilling to transmit HD signals because only one program can be transmitted at a time in a transponder. To date, compressing an HD program sufficiently to fit two programs in one satellite channel (for example, 24 MHz 4-PSK Modulation) at the same time results in unacceptable viewer picture quality. Therefore, satellite broadcast providers are hesitant to broadcast HDTV due to inefficient use of the channel. Likewise, terrestrial broadcast providers are reluctant to commit to providing full HD programs when one program fully occupies a channel in which several SD programs can reside.

SUMMARY OF THE INVENTION

In accordance with the principles of the present invention, a digital image processor identifies a video signal type, and selectively converts the original signal format to a different format as necessary. The converted signal is filtered and reconverted to the original format as necessary. The filtered signal is converted to a lower resolution and compressed to a target bit rate. Finally, the compressed signal is conveyed to an output data channel.

DESCRIPTION OF THE PREFERRED EMBODIMENT

An MPEG2 encoder including apparatus according to the principles of the present invention includes a two dimensional (vertical and horizontal, for example) filter prior to the encoder. The encoder, the output buffer and the filter each produce information which may be utilized by the other units to improve overall efficiency. Such information concerns image motion, image contrast, quantization matrix selection, scale factor selection, bit rate out of each unit, image texture, for example. The information is communicated between the units by a controller which oversees the encoding process, or by individual controllers resident in each unit.

The controller evaluates the incoming information and identifies commonalties over a group of pictures, a frame, or a partial frame which can be advantageously used to modify the operation of the filter and/or the encoder to efficiently encode the group, frame or partial frame to the target bit rate. Generally, the filter is adjusted because adjusting the filter induces less noise than adjusting the encoder. Also, the filter is actually a set of filters which allows the greatest flexibility by adjusting individual filter coefficients as needed. These filters are a horizontal anti-aliasing low-pass filter, a vertical low-pass filter, and a two-dimensional low-pass filter, generally in the sequential order just given. The controller evaluates the received information against current filter and encoder setup, and makes adjustments to one or more filers and/or to the encoder according to one or more predominant commonalties. The end result is that the input signal is low-pass filtered by the filter in a manner which generally allows the encoder to encode the image uniformly across a group of pictures, a frame, or a partial frame relative to a dominant commonality of the data being uniformly encoded.

The encoded signal may be transmitted in the available bandwidth, and then reconstructed and displayed without artifacts which would have been present otherwise. For high definition signals having 1920 by 1080 pixels per image frame, the horizontal resolution is reduced to 1280 pixels per line after filtering and before encoding to further reduce the bandwidth of the transmitted signal. The result is a hybrid image resolution which HD receivers can receive, decode and display with a minor software change.

Figure 1:
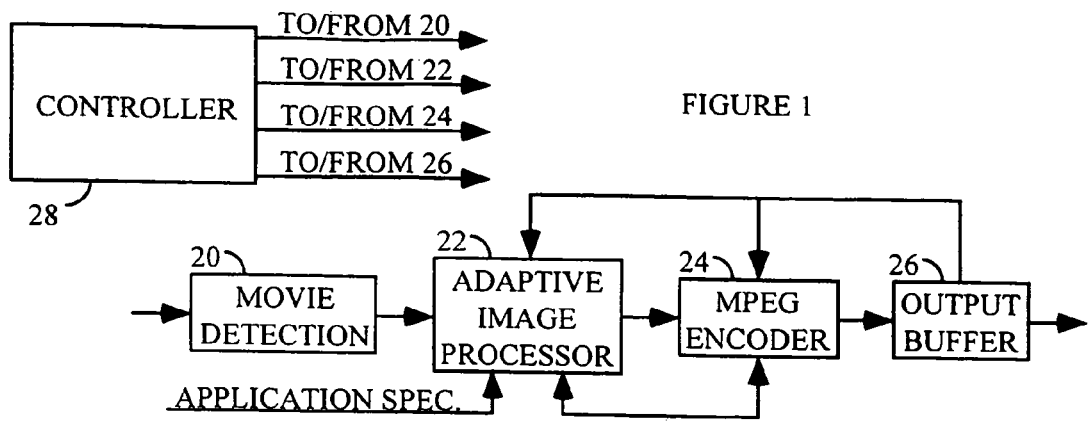
FIG. 1 shows one configuration for a video compressor in accordance with the present invention.

An exemplary configuration of the video compression system according to the present invention is shown in FIG. 1. An input video signal is received by movie detector 20, which identifies if the signal is a movie (film) signal which has been reformatted by telecine methods from 24 frames per second to 30 frames per second. The reformatted movie signal is directed to the appropriate section of adaptive image processor 22 as will be described. If the input signal is not a reformatted movie signal, the signal passes to another section of adaptive image processor 22. Identification of telecine movie signals occurs by known methods.

Processor 22 receives control information from output buffer 26 and from MPEG2 encoder 24 via controller 28, and filters image frames so that the encoder 24 can efficiently encode the frame to be within the available bit rate, and to be generally free of noticeable artifacts. Processor 22 filters the signal in two dimensions (2-D) (for example, horizontal and vertical) as needed to improve the reconstructed image quality of a MPEG2 encoded bit stream constrained to an average bit rate. The goal is to modify local 2-D frequency content of the source to improve MPEG2 coding efficiency in a manner least injurious to the MPEG2 reconstructed image with regard to image sharpness and encoding artifacts. Filtering of the signal can be done on predetermined data, for example, a group of pictures (GOP) or frames, a single frame, or pixel by pixel.

The 2-D filter low-pass filters the image. Optimally, the high frequency information which is removed is either redundant or not noticeable to the viewer. In practice, to attain the desired bit rate, some high frequency information may be removed which is noticeable to a viewer. However, a system which includes a processor 22 before MPEG2 encoding generates an image which is superior to a system without a processor 22, as will be discussed.

The filtered signal is encoded by MPEG2 encoder 24, which receives image parameters from processor 22 and output buffer 26 via controller 28, and adjusts MPEG2 compression to comply with available bit rate. Compression occurs in the same manner as described in the GA specification. Encoder 24 sends the compressed data to output buffer 26. Buffer 26 provides the compressed data at a predetermined rate to be transport encoded, modulated, and transmitted via a transmission channel using known signal processing techniques. Prior to modulation, the compressed signal may be sent to a statistical multiplexer to be multiplexed with multiple programs for transmission on a single channel. Signal processing units after buffer 26 are well known and therefore are not shown in FIG. 1 to simplify the drawing.

The video compression system can be configured to accept any type of video signal. The system of FIG. 1 is configured to accept both television (camera) and movie (film) programs formatted to known industrial standards. One common configuration would be for the system of FIG. 1 to receive the output from a pre-processor as previously described in the background, for example. The system may be configured to accept other types of video signals by adding appropriate hardware and/or software. These configurations are not shown to simplify FIG. 1.

Movie detector 20 recognizes the presence of certain relationships in the input signal that can be used to improve coding efficiency: (Type 1) 60 Field/Second Interlaced Scanned Source, (Type 2) 60 Field/Second Interlaced Scanned 30 Frame/Second Movie, (Type 3) 60 Field/Second Interlaced Scanned 24 Frame/Second Movie, (Type 4) Progressive Scanned Source, (Type 5) 60 Frame/Second Progressive Scanned 30 Frame/Second Movie, and (Type 6) 60 Frame/Second Progressive Scanned 24 Frame/Second Movie. Detection occurs in response to an external control signal (not shown) or by known techniques such as those used in current standard definition (SD) MPEG2 encoders. Signal format information is passed with the signal to adaptive image processor 22, as is described below. Movie detector 20 also detects whether the signal is interlaced scan or progressive scan type and passes that information to processor 22. These scan types are exemplary and define parameters by which signals are directed through processor 22. Implementations for other field and frame rates may also be used.

Adaptive image processor 22 performs several programmable functions which reduce the amount of data to be compressed by encoder 24. Processor 22 operates on each frame, in general, so that the processed frame can be optimally encoded to eliminate or greatly reduce noise which is noticeable to the viewer. Processor 22 may generally be viewed as a spatial varying 2-D low-pass filter, because it down-samples each image frame spatially and adaptively filters selected 2-D high frequency components from the signal. The adaptive filtering can be adjusted over a series of frames, for a single frame, or pixel-by-pixel to produce a processed frame.

Processor 22 can facilitate encoding for any type of signal. However, for this embodiment, processor 22 is programmed to operated on HD data as defined by the GA specification. This can be either 1920 by 1080 pixels per image or 1280 by 720 pixels per image. According to the GA specification, each HD format requires approximately 18 megabits per second for broadcast. To simplify the discussion, only the 1920 by 1080 format will be discussed in detail. The discussion is equally applicable for the 1280 by 720 format or any other format.

Figure 2:
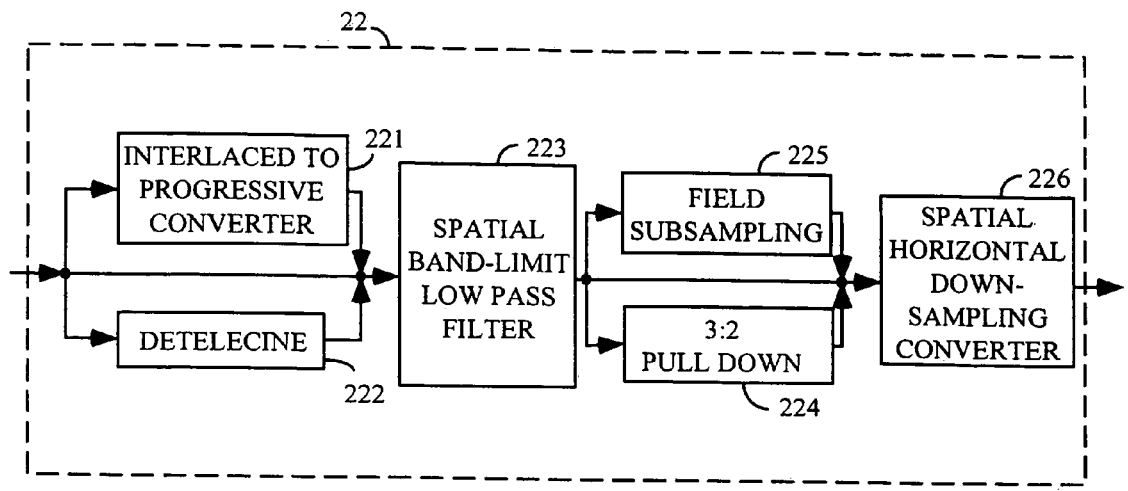
FIG. 2 shows detail of unit 22 from FIG. 1.

FIG. 2 shows details of adaptive image processor 22. Depending on signal format information received from detector 20, the image signal is routed by controller 28 (FIG. 1) to an interlaced to progressive converter 221 (Type 1), a de-telecine unit 222 (Type 2, 3), or passed through unmodified (Type 4-6) to a spatial band-limit, low-pass filter 223. Filter 223 receives the output of units 221 and 222 after these units have processed the signal.

Converter 221 receives the signal if its format contains 60 Hz interlaced fields and converts the signal to progressive frames at the rate of 60 frames per second. A progressive frame includes all the image information in each frame. Filtering a progressive scan signal typically does not introduce artifacts such as may occur when filtering field information of an interlaced signal. Converter 221 utilizes known methods to convert interlaced fields to a progressive frame.

De-telecine unit 222 eliminates the redundant fields of a 60 Hz interlaced scanned movie and reconstructs the original progressive scanned movie. The progressive format allows subsequent vertical low-pass filtering to be free of motion artifacts. If a movie source (type 2 or type 3) input were processed as a type 1 source, vertical low-pass filtering would degrade the ability of the MPEG2 encoder to detect and properly process movie source material. Coding efficiency would suffer. Unit 222 converts the signal to a progressive format and removes the redundant fields/frames before filtering because filtering may filter the redundant information differently. If the redundant information is not removed before filtering the information may not be identical after filtering, and the encoder may not recognize the signal as a Type 2/3 signal. Then the encoder would encode information which otherwise would have been removed due to the redundancy.

Also, the design of processor 22 is simplified by providing a single output clock from unit 222. If unit 222 provides output progressive film images at a rate of 24 frames per second and 30 frames per second, two output clocks and supporting circuitry would be required.

Signals which were originally generated in a 30 frames per second progressive format pass directly to filter 223. Filter 223 expects video information represented as complete image frames. Spatial, low-pass filter 223 is actually a set of filters. For example, the first filter is an anti-aliasing, horizontal low-pass filter. The second filter is a vertical low-pass filter. The final filter is a 2-D low-pass filter as previously described. The coefficients of each filter tap may be adaptively set according to control information from encoder 24 and buffer 26 as seen in FIG. 1. The progressive signal is low-pass filtered horizontally to eliminate aliasing from subsequent down sampling in sample rate converter 226. The final horizontal output of the 1920 pixels per line will be 1280 pixels per line, as will be discussed. To eliminate alias noise within the final signal, low-pass filter 223 has a cut off frequency of 640 cycles per line. The horizontal anti-alias filter included in unit 223 may be a 17 tap finite impulse response (FIR) filter with the following tap coefficients:

[f0, f1, . . . , f15, f16]=[−4, 10, 0, −30, 48, 0, −128, 276, 680, 276, −128, 0, 48, −30, 0, 10, −4]/1024.

Encoding HD video signals at a reduced bit rate normally requires additional vertical low-pass filtering to further reduce the bandwidth of the video signals. Removing vertical high frequency energy before MPEG encoding is necessary to achieve acceptable overall picture quality. Vertical frequency regions of highest phase sensitivity are attenuated. The vertical cut off frequency is set to some fraction of the Nyquist frequency. For example, a cut off frequency equal to approximately half the line rate of the HD input signal may be appropriate for some video material. For an HD signal with 1080 lines/picture height (l/ph), this would correspond to a cut off of 540 l/ph. This frequency may be programmable, and a programmable cut off frequency would be determined by controller 28 from parameters available from encoder. 24 and buffer 26 of FIG. 1 (i.e. desired bit rate, quantization matrices, etc.). The vertical low-pass filter included in unit 223 may be a 17 tap FIR filter with the following tap coefficients.

[f0, f1, . . . , f15, f16]=[−4, −7, 14, 28, −27, −81, 37, 316, 472, 316, 37, −81, −27, 28, 14, −7, −4]/1024.

As an alternative, the cut off frequency may be equal to twice the line rate of an SD signal. Generally, the vertical low-pass filter follows the horizontal anti-alias filter.

Processor 22 performs vertical filtering rather than vertical decimation, thereby maintaining constant vertical line resolution. Currently, filtering is preferred over decimation for interlaced video signals. Converting vertical line resolution for an interlaced image sequence requires complex hardware and software, resulting in high receiver costs. Vertical sample rate conversion compromises vertical high frequency performance because of the increasing tap complexity combined with Nyquist sampling (i.e., no oversampling). Cost considerations at the receiver currently discourage reducing vertical resolution to reduce artifacts and the encoded bit rate. The displayed picture would be significantly degraded by employing the current technology in vertical sample rate converters in place of the vertical low-pass filter described above. However, efficient and cost effective vertical sample rate converters may replace the vertical filter described herein without departing from the principles of the present invention.

The coefficients for both the horizontal and vertical low-pass filters can be modified by software, and applied to the pixel level, if necessary, to attain the target bit rate without generating artifacts in the reconstructed image. Generally, coefficient modification on a frame basis is sufficient. An alternative for slower processors is to preprogram a number of different coefficient sets for the filters and select the most appropriate set for the image information being processed. The greater flexibility of the adaptive filters enables the overall system to produce a data stream with fewer artifacts relative to a system without adaptive filters.

After the signal has been low-pass filtered in the horizontal and vertical directions by unit 223, controller 28 determines whether the signal can be uniformly encoded by encoder 24 on a frame basis without introducing significant quantization noise. If so the signal passes to either unit 224, 225 or 226 depending upon its format, as will be discussed. If, however, the encoding process is likely to introduce noise and/or artifacts into the signal, it is sent to a two dimensional low-pass filter in unit 223 for further adaptive filtering. Control parameters from processor 22, encoder 24, and output buffer 26 (FIG. 1) allow controller 28 (or an individual unit controller in unit 223) to determine if further filtering is needed. Control parameters used to make this determination are, for example, measurements of motion and contrast, available quantization tables, encoding efficiency and the current target bit rate.

The 2-D filter in unit 223 reduces high frequency information from an image frame primarily along the diagonal, instead of the horizontal or vertical directions alone. The human eye is very sensitive to high frequency noise in the vertical and horizontal directions relative to the diagonal directions. Removing sufficient high frequency information diagonally to allow uniform quantization by encoder 24 generally results in a better quality signal with less observable noise. The diagonal filter, like all previous filtering, operates on an entire image frame and is programmable.

The diagonal filter may be compatible with the quantization matrices in the encoder. Quantization matrices often use diamond shaped matrices for I frame quantization. However, these matrices often induce noise because B and P frames use other types of quantization matrices which retain the high frequency components during the compression and motion compensation process which occurs in encoder 24. The filters of processor 22 remove high frequency information from each image frame before MPEG2 encoder 24 processes the data into I, P and B frames in a motion estimation network. Therefore, high frequency components are generally eliminated from the P and B frames as well as from I frames. On reconstruction, the image is generally free from artifacts created by MPEG2 encoding as known.

Referring to FIG. 1, in practice, the controller 28 evaluates signal parameters, (e.g., motion, contrast, etc.) before filtering a given frame by processor 22, and determines the coefficient settings for all filters in unit 223, including diagonal filtering needed. During the filtering process of a given frame, controller 28 monitors signal parameters from processor 22, encoder 24 and buffer 26 and changes coefficients as necessary to maintain the target bit rate with minimal artifacts/noise. Each frame is filtered based upon the most recent signal parameters and is passed to encoder 24 for compression, and then to buffer 26 as subsequent information is input into filter 223.

If the signal originated as a 24 frame per second movie signal, the filtered signal is applied to 3:2 pull down unit 224. Unit 224 duplicates selected frames to provide a 30 frames per second output signal. This occurs by known methods. Then the signal passes from unit 224 to horizontal downsampling converter 226.

Field sub-sampling unit 225 converts progressive signals from filter 223 from progressive to interlaced scan format. This conversion is accomplished by known methods. Without conversion back to interlaced format, the signal would contain twice the amount of data, because the progressive frame rate from unit 221 is 60 Hz. The interlaced signal is applied to converter 226.

Sample rate converter 226 receives progressive signals at 30 frames per second directly from filter 223. Also, units 224 and 225 provide signals to converter 226 as described above. Converter 226 down samples HD signals to the transmission format selected. This format does not need to be a standard format. It may be any image ratio and frame size that is desired. A non-standard format will require receiver modification, however.

When converter 226 receives 1920 by 1080 GA HDTV signals, converter 226 down samples the horizontal information and outputs a hybrid pixel frame format of 1280 by 1080. GA HDTV compatible receivers are capable of receiving image frames containing 1920 by 1080 pixels and 1280 by 720 pixels. Therefore, GA compatible receivers may be modified to support 1280 pixels horizontal resolution and 1080 pixels vertical resolution. Compatible receiver hardware upsamples 1280 horizontal pixels to 1920 horizontal pixels in conjunction with an increase in vertical resolution. However, GA compliant receivers are not required nor programmed to receive an image frame resolution of 1280 by 1080 pixels (horizontal by vertical) as a defined format. The hardware is in place to receive and decode this resolution, but the supporting software to decode and to increase only horizontal resolution must be added. Adding the software is simple and inexpensive relative to redesigning and adding new hardware needed for other non-standard formats.

Processor 22 provides the hybrid 1280 by 1080 format because current display technology is incapable of displaying 1920 pixels/line resolution. Currently, the best television monitors can only display resolution to approximately 1200 to 1300 pixels/line. Therefore, limiting the output resolution to 1280 pixels/line in the horizontal direction has little if any adverse effect on picture quality. By providing a display resolution (1280 by 1080) which is supported by existing decoding and decompressing receiver hardware, receiver manufacturers will be minimally impacted because only a software change is necessary. For certain receivers, such as for broadcast satellites, the software modification can be downloaded and installed remotely via a satellite link. For these receivers there is no need for a service technician to become involved.

The hybrid format is advantageous because terrestrial and satellite program providers have been unwilling to transmit HD programs. A satellite transponder transmits a data stream of approximately 24 Mbits per second (Mbps). A terrestrial HDTV broadcasts can transmit up to 19 Mbps including the HD program at 18 Mbps and other information (such as audio, program guide, conditional access, etc.). Present satellite transponders can each carry at most one HDTV program, which satellite program providers contend is not sufficiently profitable. Simply reducing the horizontal frame resolution from 1920 to 1280 is not sufficient to allow the simultaneous transmission of two HD programs on a single satellite transponder. The filtering provided by processor 22 advantageously permits such dual HD transmission on a single channel.

Figure 3:
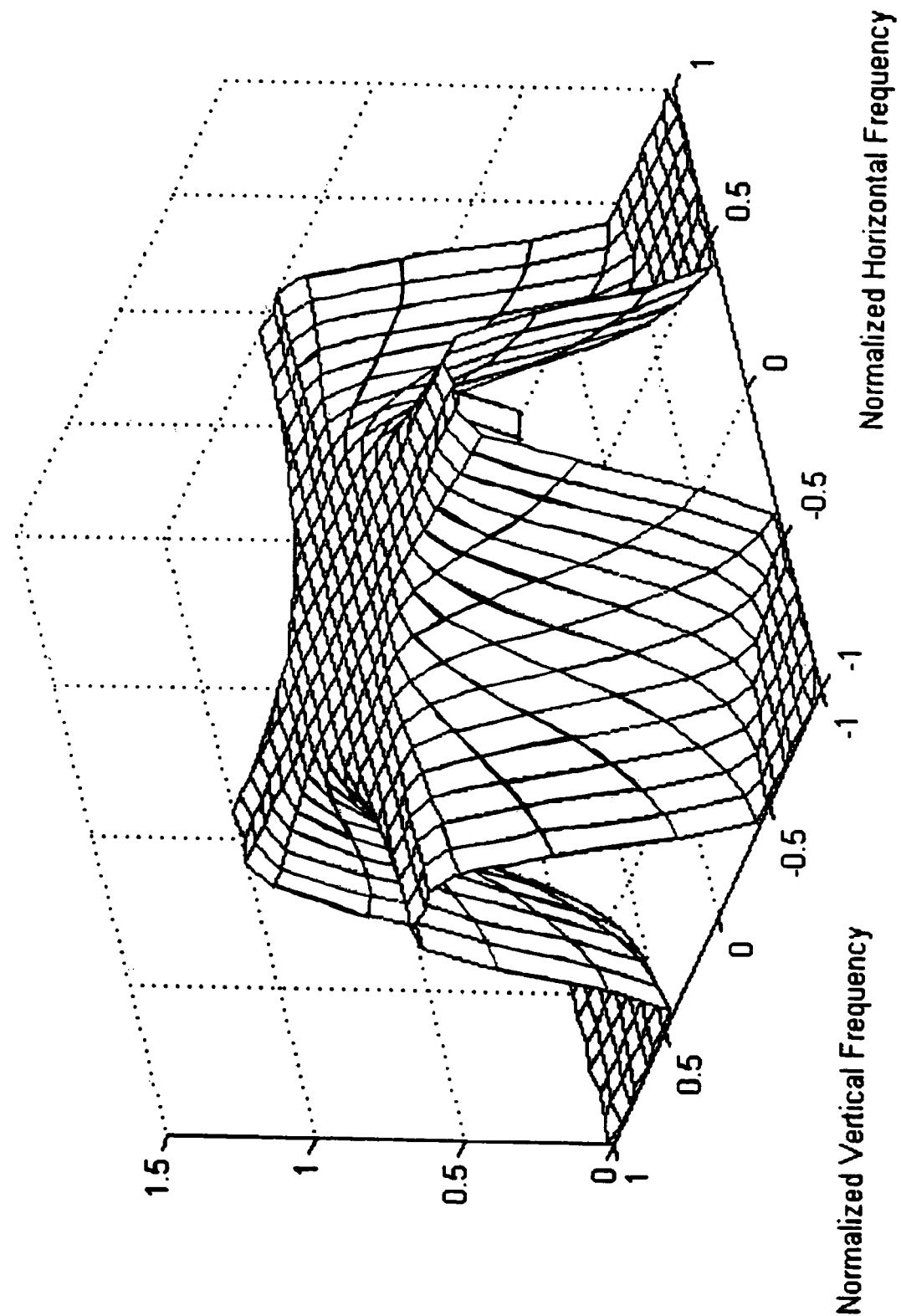
FIG. 3 shows one possible response of an adaptive filter included in unit 22.

The filtering characteristic provided by processor 22 may have various shapes, including diamond, cross, and hyperbolic from axis to axis, where for each filter the filtering is diagonal. One possible shape, 2-D Hyperbolic, is particularly advantageous in this application and has an amplitude-versus-frequency response as illustrated in FIG. 3. The adjustable filter cutoff frequency generally is set to allow the GOP, the frame or the partial frame chosen to be compressed uniformly by encoder 24. If necessary, additional horizontal and vertical high frequency information may be filtered, but this is generally not needed. As the picture complexity changes, or as the available bit rate increases, the amount of data filtered by the diagonal filter and other previous filters decreases. The 2-D filter could be described, for example, as a two-dimensional FIR with 13 taps in each direction (13 by 13), or as a 2-D) infinite impulse response (IIR) filter.

The 2-D FIR filter included in unit 223 may be a 13 by 13 tap filter with the following tap coefficients:

| 0  | 0  | 0   | 1   | −3  | 5   | −5  | 5   | −3  | 1   | 0   | 0  | 0  |
|----|----|-----|-----|-----|-----|-----|-----|-----|-----|-----|----|----|
| 0  | 0  | 1   | −1  | −3  | 9   | −11 | 9   | −3  | −1  | 1   | 0  | 0  |
| 0  | 1  | −1  | −4  | 4   | 6   | −13 | 6   | 4   | −4  | −1  | 1  | 0  |
| 1  | −1 | −4  | 1   | 14  | −13 | 4   | −13 | 14  | 1   | −4  | −1 | 1  |
| −3 | −3 | 4   | 14  | 5   | −47 | 61  | −47 | 5   | 14  | 4   | −3 | −3 |
| 5  | 9  | 6   | −13 | −47 | −55 | 193 | −55 | −47 | −13 | 6   | 9  | 5  |
| −5 | −11| −13 | 4   | 61  | 193 | 556 | 193 | 61  | 4   | −13 | −11| −5 |
| 5  | 9  | 6   | −13 | −47 | −55 | 193 | −55 | −47 | −13 | 6   | 9  | 5  |
| −3 | −3 | 4   | 14  | 5   | −47 | 61  | −47 | 5   | 14  | 4   | −3 | −3 |
| 1  | −1 | −4  | 1   | 14  | −13 | 4   | −13 | 14  | 1   | −4  | −1 | 1  |
| 0  | 1  | −1  | −4  | 4   | 6   | −13 | 6   | 4   | −4  | −1  | 1  | 0  |
| 0  | 0  | 1   | −1  | −3  | 9   | −11 | 9   | −3  | −1  | 1   | 0  | 0  |
| 0  | 0  | 0   | 1   | −3  | 5   | −5  | 5   | −3  | 1   | 0   | 0  | 0  |

For these coefficients, the DC gain is 1024. The coefficients exhibit octant symmetry which gives 28 independent coefficients. Symmetrical coefficient regions allows faster setup of the adjustable filter. It is possible, however, that each octant be different if, for example, an image or region being filtered exhibited different characteristic in one part of the image.

The filter response of processor 22 can vary continuously from one set of coefficients to another on a pixel to pixel basis. Thus, processor 22 may exhibit different operating parameters for maintaining good image quality under bit rate constraint, as will be discussed.

As mentioned previously, processor 22 can be adaptively modified to filter adaptively depending upon the parameter(s) used to define the filter adaptation. For example, variance in an image frame can be used to segment the image into regions for different processing. Edges are an important image feature in that dominant edges mask coding errors in their vicinity, and they can also define image regions. Colorimetry may be used to identify areas of low complexity, such as flesh and sky. Textures may be identified and processed as a region as well. Textures are generally less important than edges. Textures, therefore, identify regions which may be filtered more that other regions. Also, cinematic composition can be used to locate important figures or action which require higher coding efficiency and, thus, less filtering. Background is generally softened by the depth of field of the camera optics and may be more heavily filtered. Pan and scan information may be used to define the center of interest of an image for different processing by processor 22.

The operation of encoder 24 is compatible with the MPEG2 standard. Encoder 24 may provide information via controller 28 which processor 22 may use to enhance performance. Such information may include the bit rate information, for example. This bit rate information may comprise the average bit rate for a GOP, the frame bit rate, and the macroblock or block bit rate. Other information which may enhance the performance of processor 22 includes the discrete cosine transform complexity, the type quantization matrix being used, and the quantization matrix step size being used. Also, processor 22 may provide information to encoder 24 via controller 28 to adjust its operation to improve encoding performance.

After being formed into a transport packet data stream using known techniques, the HD signal is transmitted to a receiver in a known manner, e.g., as described in the Grand Alliance specification. Except for the required up-sampling to a full HD pixel resolution at the receiver, the signal processing provided by processor 22 is transparent to a decoder in a Grand Alliance compatible receiver.

At the receiver, the data stream is demodulated and the transport stream is processed to recover the data packets and program information using known techniques. For HD programs in the hybrid format described above, the signal is upsampled in the horizontal direction in the display processor if the display requires a full HD signal. The number of vertical lines in the image signal is unchanged. This reconstructs the full HD signal of 1920 by 1080 resolution for display by a high definition image reproducing device. If the image display device requires less than a full HD signal, the signal is appropriately down sampled during image reconstruction before display by known methods. Existing receivers which are Grand Alliance compatible require a software modification to be able to reconstruct the hybrid signal. The software modification allows horizontal and vertical hardware and software processing routines assigned to Grand Alliance standardized modes to be independently selected as needed for the incoming signal.

Figure 4:
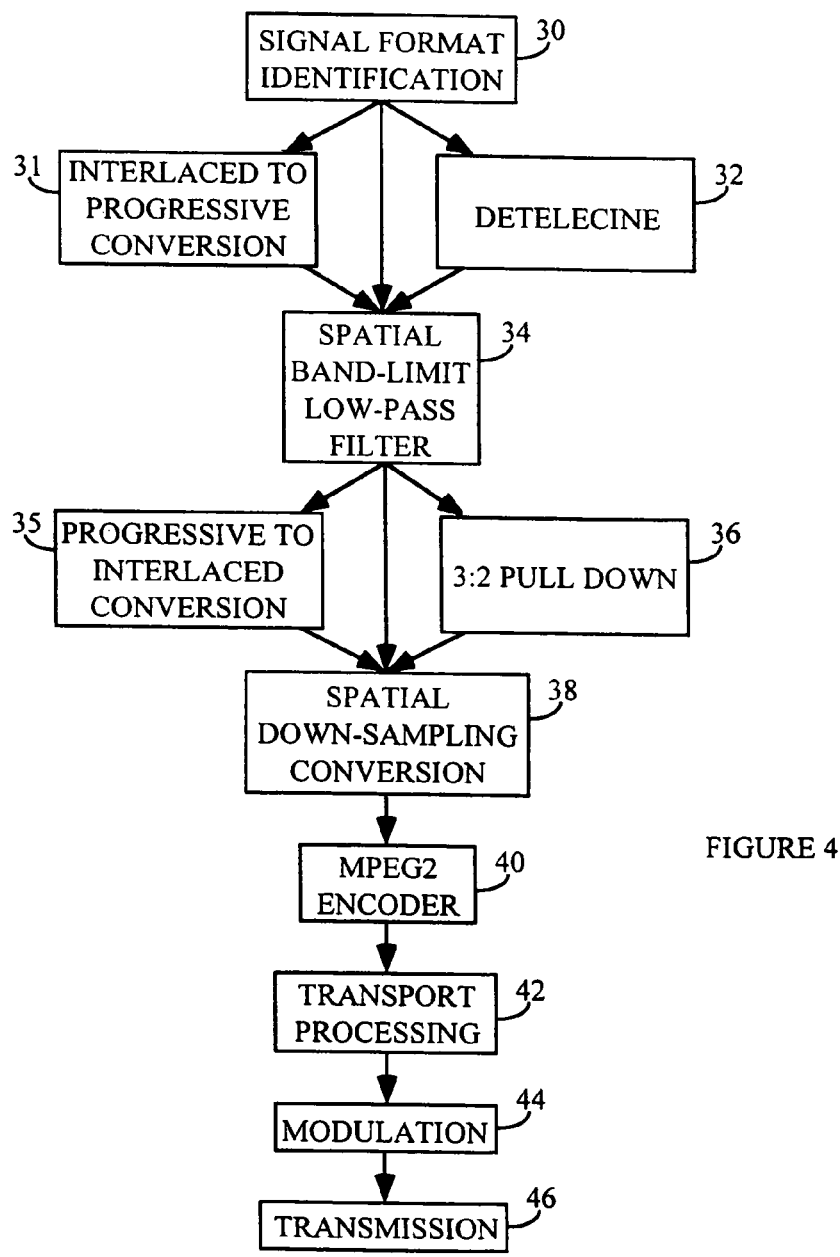
FIG. 4 is a flow chart of an exemplary transmitting system using the present invention.

FIG. 4 is a flow chart of the video image signal flow through the encoding system. In step 30, the signal format is identified and the identifying information is conveyed with the video signal. The format information may indicate, for example, whether the signal is originally from a movie with a 24 frame per second format, and whether the signal is interlaced or progressive. If the video signal is interlaced, the signal is converted to a progressive signal at 60 frames per second in step 31. If the signal has been converted by 3:2 pull down, the redundant frames are removed in step 32. If the video signal is already in a camera progressive format it passes directly to the filter of step 34. In step 34, the video signal is spatially low-passed filtered. This includes vertical, horizontal and diagonal filtering as described above. Step 35 reconverts the progressive signal, which was converted from and interlaced signal in step 31, back to an interlaced signal. In step 36 the signal is subjected to 3:2 pull down to replace redundant frames previously deleted in step 32. Video signals passing directly from step 30 to step 34 above now pass directly from step 34 to step 38. In step 38, the video signal from one of steps 34, 35 and 36 is subsampled to the hybrid 1280 by 1080 HD signal resolution defined above, or to another output format as desired. In step 40, the hybrid signal is MPEG2 encoded as previously described. Step 42 transport processes the encoded signal, and step 44 modulates the transport signal as required for transmission via an output channel, such as an RF terrestrial broadcast channel. Finally, step 46 transmits the modulated signal. Steps 42 to 46 occur by known methods.

Figure 5:
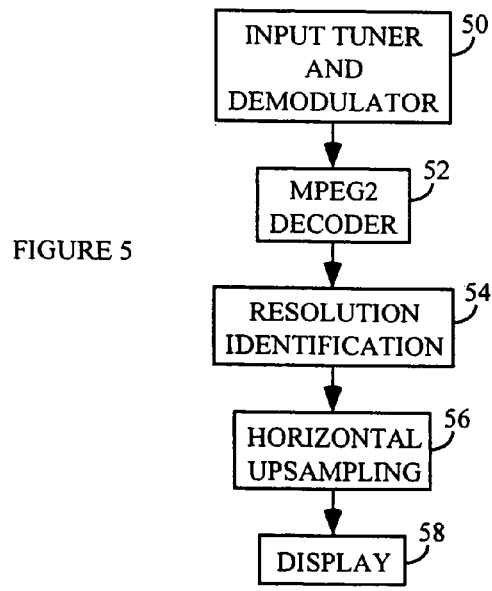
FIG. 5 is a flow chart of an exemplary receiving system using the present invention.

FIG. 5 is a flow chart of the transmitted image signal flow through a receiver. This flow chart assumes that the image resolution of the received signal is the hybrid 1280 by 1080

HD signal defined above. In step 50, the transmitted signal is received by a tuner and demodulated. The demodulated signal is MPEG2 decoded and decompressed in step 52. Step 54 identifies the video signal resolution as 1280 by 1080 pixels per image via control information sent with the signal. The Grand Alliance MPEG2 protocol supplies image resolution information with the transmitted signal. The hybrid signal is generally identified by a unique code as is any other defined resolution. The hybrid signal could also be defined otherwise, for example, by information in the user data of the transmitted data. The hybrid video signal is horizontally upsampled to a full 1920 by 1080 HD signal during display processing in step 56. The hybrid signal is upsampled with new software in association with existing hardware and software resident in the receiver as previously described. Finally, the full HD video signal is displayed on a 1920 by 1080 display in step 58. Steps 50, 52 and 58 employ known methods.

The apparatus and methods described above can be applied in a number of configurations to achieve an improved image reconstruction for high definition display. Adaptive and non-adaptive options may be used depending on the requirements of a particular system. Some of these options are discussed below.

A non-adaptive strategy would be to set frame filtering of processor 22 to a target bit rate and allow all images to be processed uniformly. Another non-adaptive strategy would make the assumption that the center of a displayed image is the most interesting region. This also assumes that peripheries of the image are less interesting and therefore less important to the viewer. The coefficients of the filters of processor 22 are set by controller 28 via parameters which are functions of pixel spatial position and all image information is uniformly processed.

An adaptive option is to segment the image into regions using texture model parameters, local video variance, colormetrics, or other picture complexity measures based on the source image. Filtering characteristics of processor 22 are adaptively modified for different regions.

Another approach is to adaptively modify the filtering characteristics of processor 22 as a function of the difference between the actual bit rate and the target bit rate. In this case, a single parameter controls transition in filter coefficients for the 2-D frequency response.

Another strategy is to design the 2-D frequency response of the filtering provided by processor 22 to be compatible with the quantization matrix employed by encoder 24. A quantization matrix may be viewed as a low-pass filter which has 2-D shape. For this strategy the values of the filter coefficients would be a function of the quantization matrix step size. As the step size is changed according to known encoder operation, a corresponding change would occur for corresponding filter coefficients.

The options noted above illustrate the flexibility of a system employing the principles of the invention. Such a system preferably operates within the context of MPEG2 rate control to extend the MPEG2 compression capability by reducing encoding artifacts and other noise. The versatility and economics of HDTV deployment is improved through the use of the invention. The number of HD programs transmitted per transponder in a direct broadcast satellite system (i.e., 24 MHz 4-PSK) is increased from one to two programs, or one HD program with multiple SD programs. The ability to transmit one HD program with multiple SD programs in a 6 MHz terrestrial broadcast channel is attainable in accordance with the principles of the present invention. Previously, broadcasters were limited to transmitting one HD program in one channel, or multiple SD programs in one channel.

Although the invention has been described in the context of HD signal transmitting and receiving systems, the principles of the invention are applicable to other arrangements such as data storage systems. In systems such as digital video disk (DVD), video data is encoded and stored for replay at a later time. The storage medium has a limited amount of storage space available. If an encoded program, a movie, or other video sequence exceeds the amount of space available on the medium, further encoding/compression to make the program fit may create unacceptable artifacts. The invention described above may be used to efficiently encode the program to a lower bit rate allowing the program to fit on the disk. Or, multiple programs may now fit on one disk. Digital storage onto tape may also benefit as describe above.

The invention claimed is:

1. A method for processing a video signal, comprising the steps of:
   filtering a video signal to produce a filtered video signal;
   converting said filtered video signal to a lower resolution to produce a lower resolution video signal having a resolution of 1280×1080 samples per frame;
   encoding said lower resolution video signal to produce an encoded video signal; and
   conveying said encoded video signal to an output channel.

2. In a high definition video signal processing system, a method for processing a received digital video signal subject to exhibiting more than one image resolution, including a resolution of 1280 by 1080 data samples per frame, comprising the steps:
   decoding said signal to produce a decoded signal;
   determining the image resolution of said decoded signal;
   converting horizontal information from said decoded signal to a different resolution when said decoded signal has a resolution of 1280 by 1080 data samples per frame, to produce a converted signal and conveying said converted signal to an output device.

3. The method of claim 2, wherein said conversion is upconversion and said different resolution is 1920 horizontal samples per line.

4. The method of claim 2 wherein said conversion is downconversion and said different resolution is a lower resolution.

5. The method of claim 2, wherein said received digital video signal is MPEG2 compatible.

6. A method for processing a video signal, comprising the steps of:
   adaptively filtering a detected video signal to produce a filtered signal;
   converting said filtered signal to a lower spatial resolution to produce a lower spatial resolution signal;
   MPEG encoding said lower spatial resolution signal to produce an encoded signal; and
   conveying said encoded signal to an output channel,
   wherein said adaptive filtering is a function of image signal parameters of the detected video signal prior to filtering and feedback information from said encoding of the encoded signal.

7. The method according to claim 6, wherein the adaptively filtering comprises two dimensional filtering of the detected video signal.

8. The method according to claim 6, wherein the adaptively filtering comprises modifying filter coefficients during the filtering of a given frame of said detected videosignal.

* * * * *